United States Patent
Campbell et al.

(10) Patent No.: US 9,841,498 B1
(45) Date of Patent: Dec. 12, 2017

(54) PHASE CODED LINEAR FREQUENCY MODULATION FOR RADAR

(71) Applicant: Waymo LLC, Mountain View, CA (US)

(72) Inventors: Tim Campbell, Mountain View, CA (US); Russell Leigh Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 166 days.

(21) Appl. No.: 14/548,807

(22) Filed: Nov. 20, 2014

(51) Int. Cl.
  *G01S 13/02* (2006.01)
  *G01S 7/41* (2006.01)
(52) U.S. Cl.
  CPC ............... *G01S 13/02* (2013.01); *G01S 7/41* (2013.01)
(58) Field of Classification Search
  CPC .................................. G01S 13/02; G01S 7/41
  USPC .......................................................... 342/59
  See application file for complete search history.

(56) References Cited

U.S. PATENT DOCUMENTS

| | | | |
|---|---|---|---|
| 4,524,362 A | 6/1985 | Lewis | |
| 5,151,702 A * | 9/1992 | Urkowitz | G01S 13/522 342/116 |
| H001181 H | 5/1993 | Rihaczek | |
| 5,374,903 A | 12/1994 | Blanton | |
| 5,818,383 A | 10/1998 | Stockburger | |
| 7,787,779 B2 | 8/2010 | Weiner | |
| 2011/0013716 A1* | 1/2011 | Brodzik | G01S 13/003 375/295 |
| 2014/0085128 A1* | 3/2014 | Kishigami | G01S 13/288 342/118 |
| 2016/0003946 A1* | 1/2016 | Gilliland | G01S 17/10 356/5.01 |

\* cited by examiner

*Primary Examiner* — Tashiana Adams
*Assistant Examiner* — Helena Seraydaryan
(74) *Attorney, Agent, or Firm* — McDonnell Boehnen Hulbert & Berghoff LLP

(57) ABSTRACT

Disclosed herein are embodiments that relate to phase coded linear frequency modulation for a radar system. Embodiments include transmitting at least two signal pulses. The transmitting includes transmitting a first pulse with a first phase modulation and a first chip rate, and transmitting a second pulse with a second phase modulation and a second chip rate. The second chip rate may be different than the first chip rate. Embodiments also include receiving a signal that includes at least two reflection signals associated with reflection of the at least two transmitted signal pulses. Embodiments further include processing the received signal to determine target information. The processing includes filtering the received signal to time-align the at least two reflection signals. The filtering includes applying a frequency-dependent time delay to one or more of the at least two reflection signals. Additionally, embodiments include removing phase code modulations from the time-aligned reflection signals.

20 Claims, 5 Drawing Sheets

PHASE CODED LINEAR FREQUENCY MODULATION FOR RADAR

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to phase coded linear frequency modulation for a radar system. In one aspect, the present application describes a method of signaling for use with a radar system. The method includes transmitting, by a radar unit, at least two signal pulses. The transmitting includes transmitting a first pulse with a first phase modulation and a first chip rate, and transmitting a second pulse with a second phase modulation and a second chip rate. The second chip rate may be different than the first chip rate. The method also includes receiving, by the radar unit, a signal that includes at least two reflection signals associated with reflection of the at least two transmitted signal pulses. The method further includes processing the received signal to determine target information. The processing of the method includes filtering the received signal to time-align the at least two reflection signals. The filtering includes applying a frequency-dependent time delay to one or more of the at least two reflection signals. Additionally, the method includes removing phase modulations from the time-aligned reflection signals.

In another aspect, the present application describes an apparatus. The apparatus includes a radar unit. The radar unit has a transmitter configured to transmit at least two signal pulses. The transmitter may be further configured to transmit a first pulse with a first phase modulation and a first chip rate, and transmit a second pulse with a second phase modulation and a second chip rate. The second chip rate may be different than the first chip rate. The radar unit also has a receiver configured to receive a signal that includes at least two reflection signals associated with reflection of the at least two transmitted signal pulses. The apparatus also includes a processing unit configured to process the received signal to determine target information. The processing unit may be configured to process the received signals by filtering the received signal to time-align the at least two reflection signals. The filtering may include applying a frequency-dependent time delay to one or more of the at least two reflection signals. The processing may also include removing phase modulations from the time-aligned reflection signals.

In yet another example, a computing device is provided. The computing device may include a processor and a computer readable medium having stored thereon program instructions that when executed by the processor cause the computing device to perform functions. The functions include signaling for use with a radar system. The functions include transmitting, by a radar unit, at least two signal pulses. The transmitting includes transmitting a first pulse with a first phase modulation and a first chip rate, and transmitting a second pulse with a second phase modulation and a second chip rate. The second chip rate may be different than the first chip rate. The functions also include receiving, by the radar unit, a signal that includes at least two reflection signals associated with reflection of the at least two transmitted signal pulses. The functions further include processing the received signal to determine target information. The processing of the function includes filtering the received signal to time-align the at least two reflection signals. The filtering includes applying a frequency-dependent time delay to one or more of the at least two reflection signals. Additionally, the functions include removing phase modulations from the time-aligned reflection signals.

In another aspect, the present application describes an apparatus. The apparatus may be configured for signaling for use with a radar system. The apparatus includes means for transmitting at least two signal pulses. The means for transmitting includes means for transmitting a first pulse with a first phase modulation and a first chip rate, and means for transmitting a second pulse with a second phase modulation and a second chip rate. The second chip rate may be different than the first chip rate. The apparatus also includes means for receiving a signal that includes at least two reflection signals associated with reflection of the at least two transmitted signal pulses. The apparatus further includes means for processing the received signal to determine target information. The means for processing may further include means for filtering the received signal to time-align the at least two reflection signals. The means for filtering includes means for applying a frequency-dependent time delay to one or more of the at least two reflection signals. Additionally, the means for processing includes means for removing phase modulations from the time-aligned reflection signals.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
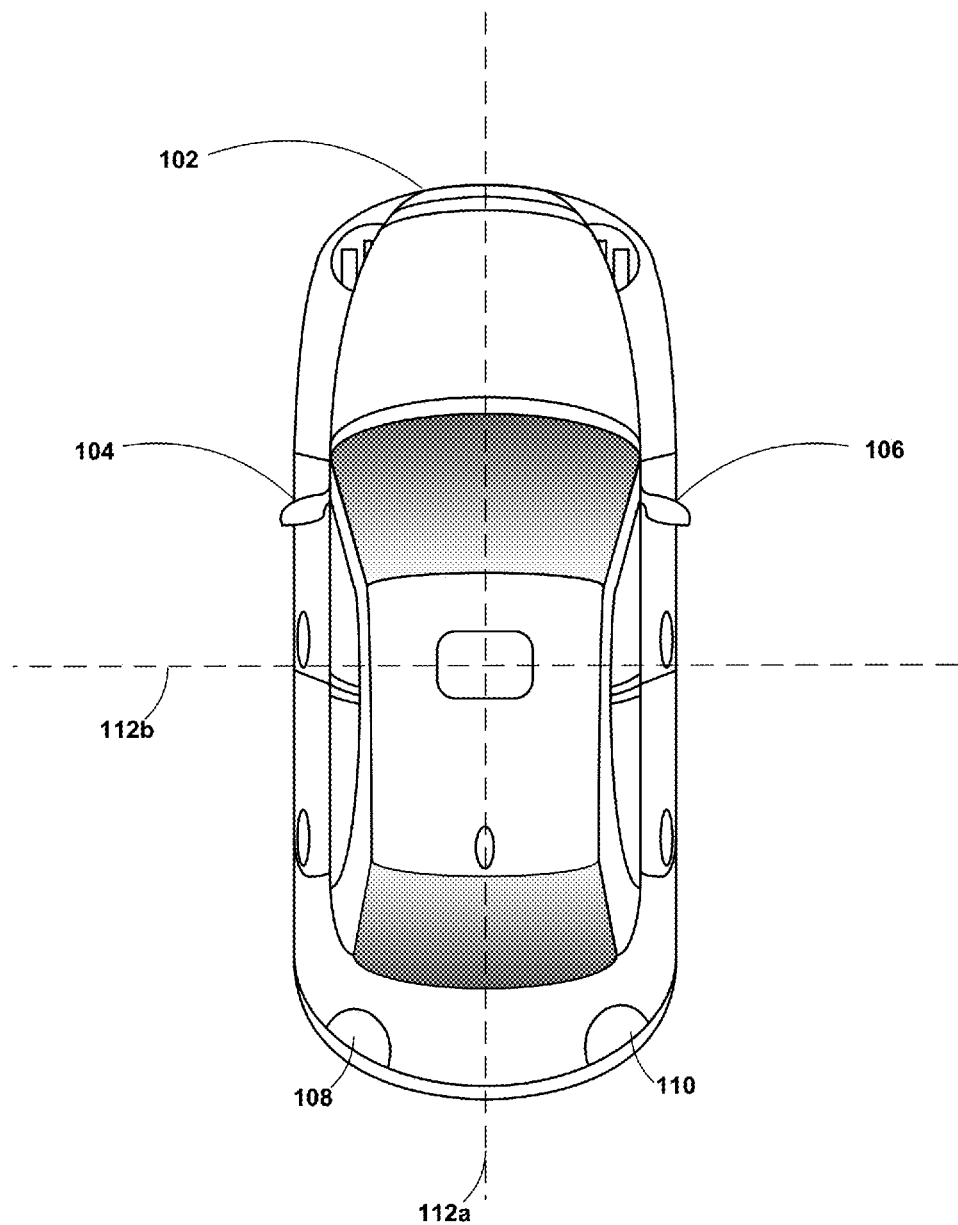
FIG. 1 illustrates an example layout of radar sectors

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for phase coded linear frequency modulation for radar. In practice, vehicular radar systems may feature multiple radar units with each radar unit having an associated field of view. Additionally, the radar units may operate in an environment that may have radio noise. Typically, the signals from the multiple radar units and the radio noise may cause undesirable interference for the radar system. The apparatus and methods presented herein allow improved radar system functionality by using phase coded linear frequency modulation for radar to aid in radar system operation.

Traditionally, vehicular radar systems have featured a single radar unit looking in a forward direction. These traditional radar systems would also typically only direct the radar beam in a single direction. When a vehicle has only a single radar unit with a beam that only was directed in a single direction, the precision required in the placement of the radar unit may be not as great as systems with multiple radar units with steerable beams. The non-steerable beam only interrogating one direction may cause the lower precision requirement. For example, a traditional vehicular radar system may only be configured to detect the presence of another vehicle directly in front of the vehicle having the radar system. Thus, as long as a radar beam generally points in the forward direction the traditional radar system would be able to detect the vehicle.

More advanced radar systems may be used with a vehicle in order to obtain a wider field of view than just that directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the car. In some examples, multiple radar units may be combined with steerable radar beams to further increase the interrogation region and the imagining resolution of the vehicular radar system.

An example radar system for use with the present disclosure may include multi-sector 90 degree field of view radar antenna architecture that may enable an antenna to both scan across approximately 90-degrees of the azimuth plane (e.g. the horizontal plane) while also being mountable on various surfaces of a vehicle. Having a radar antenna with a 90 degree field of view may enable a radar system to scan a full 360 azimuth plane by having four radar units each configured to scan one 90-degree non-overlapping sector. Therefore, the example disclosed radar system may be able to steer a radar beam to interrogate the entire region in the azimuth plane of the vehicle. So that for example, four such radars located on four corners of a car would provide a full 360 coverage around the car. For example, a system such as this may aid in autonomous driving of a vehicle.

When each radar unit can scan or span a 90-degree region, placing 4 radar units on a vehicle may enable the vehicle to scan a beam over the full 360 azimuth plane. Each of the four radar units may be configured to scan a beam over one sector (i.e. one quarter of the azimuth plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360 azimuth plane.

In some examples, the radar sectors may be defined based on where the radar units may be mounted on the vehicle. In one example, one radar unit may be mounted in each of the side mirrors of the vehicle. The other two radar units may be mounted behind the taillights of the vehicle. In this example, the quadrants may be defined based on axes where one axis aligns with the direction of vehicular motion and the other axis aligns with the middle of the vehicle from front to back. In another example, the radar units may be mounted in order to have one pointing forward, one pointing backward, and one pointing to each side. In this second example, the axes of the quadrants may be at a 45 degree angle to the direction of motion of the vehicle. Additionally, the radar unit may be mounted on top of the vehicle.

The modular multi-sector 90 degree field of view radar antenna architecture may be able to steer the radar beams emitted from each radar unit. The radar beams may be steered by the radar units in various ways. For example, in some embodiments, the radar units may be able to steer the beam in an approximately continuous manner across the 90 degree field of view for the respective antenna or the radar units may be configured with sectoral sub beams spanning the 90 degrees. In other embodiments, the radar units may be able to steer the radar beam to predetermined directions within the 90 degree field of view for the respective antenna.

FIG. 1 illustrates an example layout of radar sectors for an autonomous vehicle 102. As shown in FIG. 1, each of the radar sectors may have an angular width approximately equal to the scanning range of the radar units (as will be described with respect to FIG. 2). For example, the sectors of FIG. 1 divide the azimuth plane around the autonomous vehicle 102 into 90 degree sectors. However, in examples where the radar units are configured to scan a radar beam over a different angle than 90 degrees, the width and number of sectors may change.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45 degree angle with respect to the two axes of the vehicle 102. By mounting the radar units a 45 degree angle with respect to the two axes of the vehicle 102, a 90 degree scan of the radar unit would scan from one vehicle axis to the other vehicle axis. For example, a radar unit mounted at a 45 degree angle to the axes in side mirror unit 104 may be able to scan the front left sector (i.e. from the vertical axis 112a through the front of the vehicle 102 to the axis 112b that runs through the side of the vehicle). An additional radar unit may be mounted at a 45 degree angle to the axes in side mirror unit 106 may be able to scan the front right sector. In order to scan the back right sector, a radar unit may be mounted in taillight unit 110. Additionally, in order to scan the back left sector, a radar unit may be mounted in taillight unit 108. The radar unit placements shown in FIG. 1 are merely one example. In various other examples, the radar units may be placed in other locations, such as on top of the vehicle, or within or behind other vehicle components. Further, the sectors may also be defined differently in various embodiments. For example, the sectors may be at a 45 degree angle with respect to the vehicle. In this example, one radar unit may face forward, another backward, and the other two to the sides of the vehicle.

In some examples, all the radar units of vehicle 102 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, a vehicle 102 with one radar unit would need that radar unit to be able to scan over the full 360 degrees.

If the vehicle 102 had two radar units, each would scan approximately 180 degrees. For three radar units, each would be configured to scan 120 degrees. For four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 2:
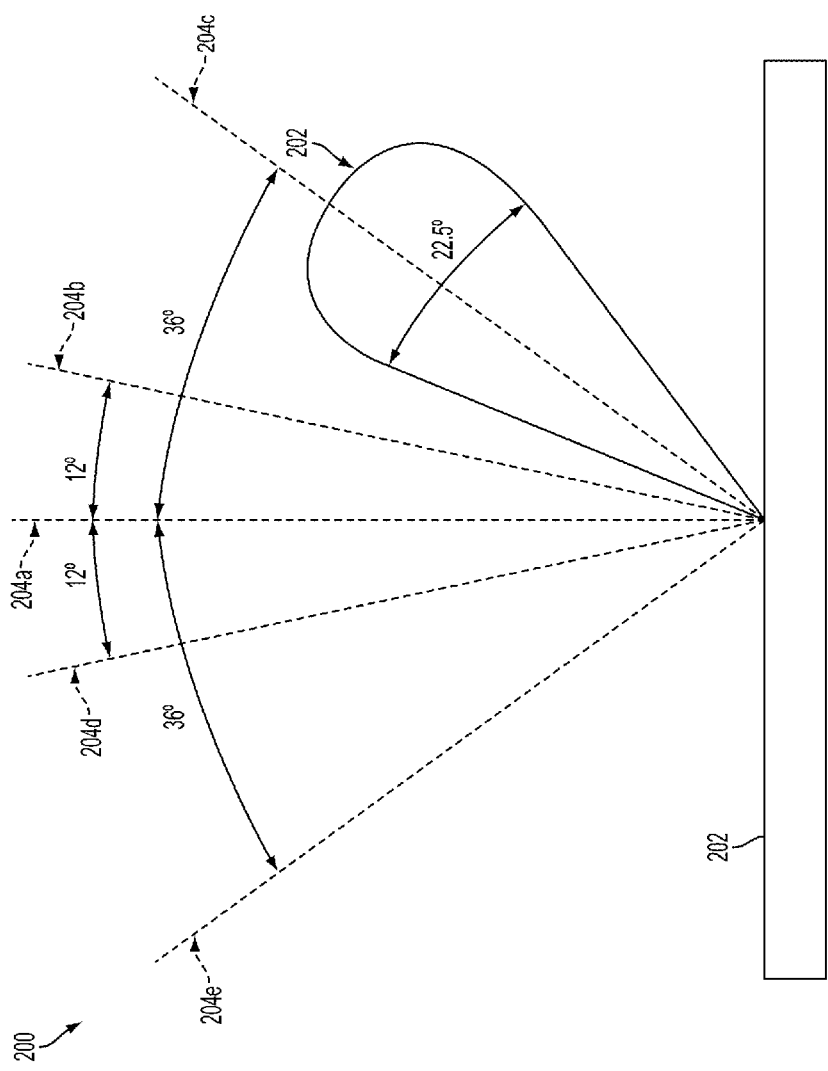
FIG. 2 illustrates example beam steering for a sector for a radar unit.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth plane. In other embodiments, the radar unit 200 may be able to scan the radar beam in discrete steps across the various angles of the azimuth plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90 degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees 604e, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of the radar beam 206 may be varied depending on the specific example.

For example, and further discussed below, a radar beam of a radar unit may be configured to only scan a 60 degree region. If a radar unit can scan a 60 degree region, six radar units may be used to scan a full 360 azimuth plane. However, if the radar unit can scan 90 degrees, four radar units may scan the full 360 azimuth plane.

Figure 3:
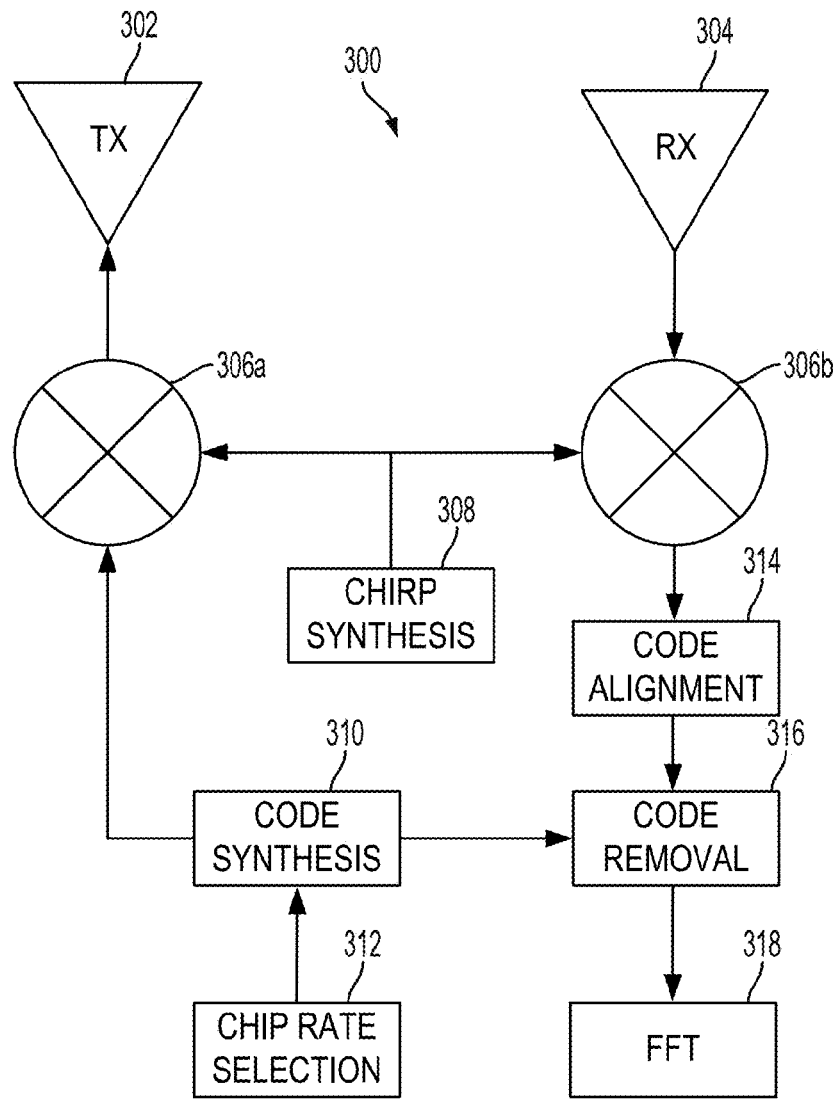
FIG. 3 illustrates an example radar system with phase coded linear frequency modulation.

FIG. 3 illustrates an example radar system 300 with phase coded linear frequency modulation. The radar system 300 includes both a transmitter 302 and a receiver 304. The transmitter 302 may include components and electronics configured to transmit a radar signal. For example, the transmitter 302 may include circuitry configured to amplify a signal to a power level for transmission. The transmitter 302 may also include at least on antenna configured to transmit the radar signal. The receiver 304 may include components and electronics configured to receive a reflected radar signal. For example, the receiver 304 may include circuitry configured to amplify a received signal for further processing. The receiver 304 may also include at least on antenna configured to receive the reflected radar signal. In some examples, radar system 300 may include different antennas for transmission and antennas for reception of signals. In other examples, the radar system 300 may use the same antennas for both transmission and reception of signals.

The radar system 300 may also include a chirp synthesis module 308. The chirp synthesis module 308 is configured to create chirp signal. The chirp signal may be used with both the transmission and reception of signals with the radar unit 300. The chirp signal created by the chirp synthesis module 308 may a linear frequency modulated (LFM) signal. An LFM signal may be an up-chirp, that is, it has a frequency that increase linearly with time, or it may be a down-chirp, that is, it has a frequency that decreases linearly with time. An LFM signal may be used because the use of LFM signaling in radar may combine the benefits of the high energy of a long pulse width signal with the high resolution of a short pulse width signal. Higher energies allow a radar system to work at longer distances and also to detect smaller objects. Shorter pulses may allow a radar system to more finely detect ranges of detected objects.

The radar system 300 also includes a code synthesis module 310 and a chip rate selection module 312. The code synthesis module is configured to create an encoding for the transmitted signal. The encoding is configured to allow multiple radar units to function within proximity of each other. If there are several radar modules operating in the vicinity of each other and each does not have a unique encoding, the radar units may interfere with each other. However, by providing an encoding for each radar unit, the radar unit may be able to resolve received reflections to determine the portion of the received signal corresponding to a signal transmitted by the respective radar unit.

Additionally, the presently disclosed encodings may allow a single radar unit to transmit multiple orthogonally-encoded signals at one time (i.e. based on one LFM ramp signal). This may allow a radar unit to function as a multiple input, multiple output (MIMO) radar. Further, if a single radar unit transmits multiple orthogonally-encoded signals at one time, the signals may be received and decoded by multiple radar units, as long as the receiving radar unit applies the correct code to decode the radar signal.

In one example, multiple vehicles driving within proximity of each other may each have radar units. When the radar unit from one vehicle transmits a signal, the radar unit of a different vehicle may receive that signal. Without the use of an encoding on the signal, the radar unit receiving the signal may not operate correctly. The radar unit may incorrectly operate as if that respective radar unit transmitted the received signal. However, by transmitting signals with unique encodings a radar unit may filter or remove undesired signals from processing. In some further examples, a single vehicle may feature multiple radar units. Similarly, each radar unit may ideally operate by only receiving signals based on reflections from signals transmitting by the respective radar unit. Thus, each radar unit of a single vehicle may also be configured to transmit signals with an encoding unique to the respective radar unit.

In some examples, the code synthesis module 310 may create a binary phase-shift key (BPSK) signal for the encoding. The BPSK signal may have a code rate based on the output of the chip rate selection module 312. In some examples, the chip rate selection module 312 may selectively output a desired signaling chip rate based on a set chip rate. In other examples, the chip rate selection module 312 may selectively output a desired signaling chip rate based on a range of possible chip rates. Thus, in some examples, the chip rate of the chip rate selection module 312 may cause the BPSK signal to have different signaling rates at different times. In one example, the chip rate selection module 312 may output a rate between 500 kiloHertz (kHz) and 600 kHz.

A BPSK modulation scheme encodes signals by modulating the phase of the carrier signal from in-phase to 180 degrees out-of-phase based on a respective code. In some embodiments, the codes may be orthogonal. (i.e. the codes may be mathematically defined so that if two signals are received at the same time, with different codes, each signal may be reconstructed due to the encoding). Here, the code synthesis module 310 may create the BPSK modulation with a respective code having a rate specified by the chip rate selection module 312. In some further embodiments, other modulation schemes may be used as well. For example, quadrature phase-shift keying (QPSK), higher bit-order phase-shift keying (PSK), differential phase-shift keying (DPSK), or other modulation schemes may be used as well.

For transmission of a radar signal, the transmitter 302 may receive the signal output by the chirp synthesis module 308 after it has been mixed by mixer 306a along with the output of code synthesis module 310. When the mixer 306a mixes the chirp signal from the chirp synthesis module 308 with the output of code synthesis module 310, a modulated LFM radar signal is created. The transmitter 302 may transmit this modulated LFM radar signal.

When the receiver 304 receives reflected radio signals, the output of the receiver 304 may be coupled to the input of mixer 306b. The received reflected radio signals from the receiver 304 may be mixed with the output of the chirp synthesis module 308. By mixing radio signals from the receiver 304 with the output of the chirp synthesis module 308, the chirp is removed from the received signals. Removing the chirp signal may be known as "dechirping." After mixing, a signal is output that includes the superposition of phase-encoded reflections from many different ranges.

The output of the mixer 306b may be supplied to the code alignment module 314. The code alignment module 314 may apply a time delay. The time delay applied may be based on a range of interest over which the reflected signal will be analyzed. By applying the time delay, the signal output by the code alignment module 314 may be adjusted in a way that the reflected signal may be decoded to supply information about the range of interest associated with the selected delay.

The output of the code alignment module 314 may be coupled to the code removal module 316. The code removal module 316 combines the output of the code alignment module 314 with the conjugate of the code from the code synthesis module 310. By mixing the output of the code alignment module 314 with the code from the code synthesis module 310, the modulation encoding can be removed from the signal. After the modulation is removed (i.e., demodulated), a signal will be left that that results in a tone corresponding to the region of interest. Undesirable signals, such as those from regions other than the desired region, will form signals similar to white noise. These white noise signals may be easily filtered or removed.

After the modulation encoding is removed, the FFT module 318 may perform a Fast Fourier Transform on the signal. The Fast Fourier Transform converts a time-domain signal into a frequency-domain signal. Here, taking the Fast Fourier Transform of the demodulated signal converts the reflected signals into frequency domain signals. The frequency domain signals correspond to reflections in the target region. Reflections in the target region may have a Doppler frequency shift based on a velocity of the object.

Figure 4:
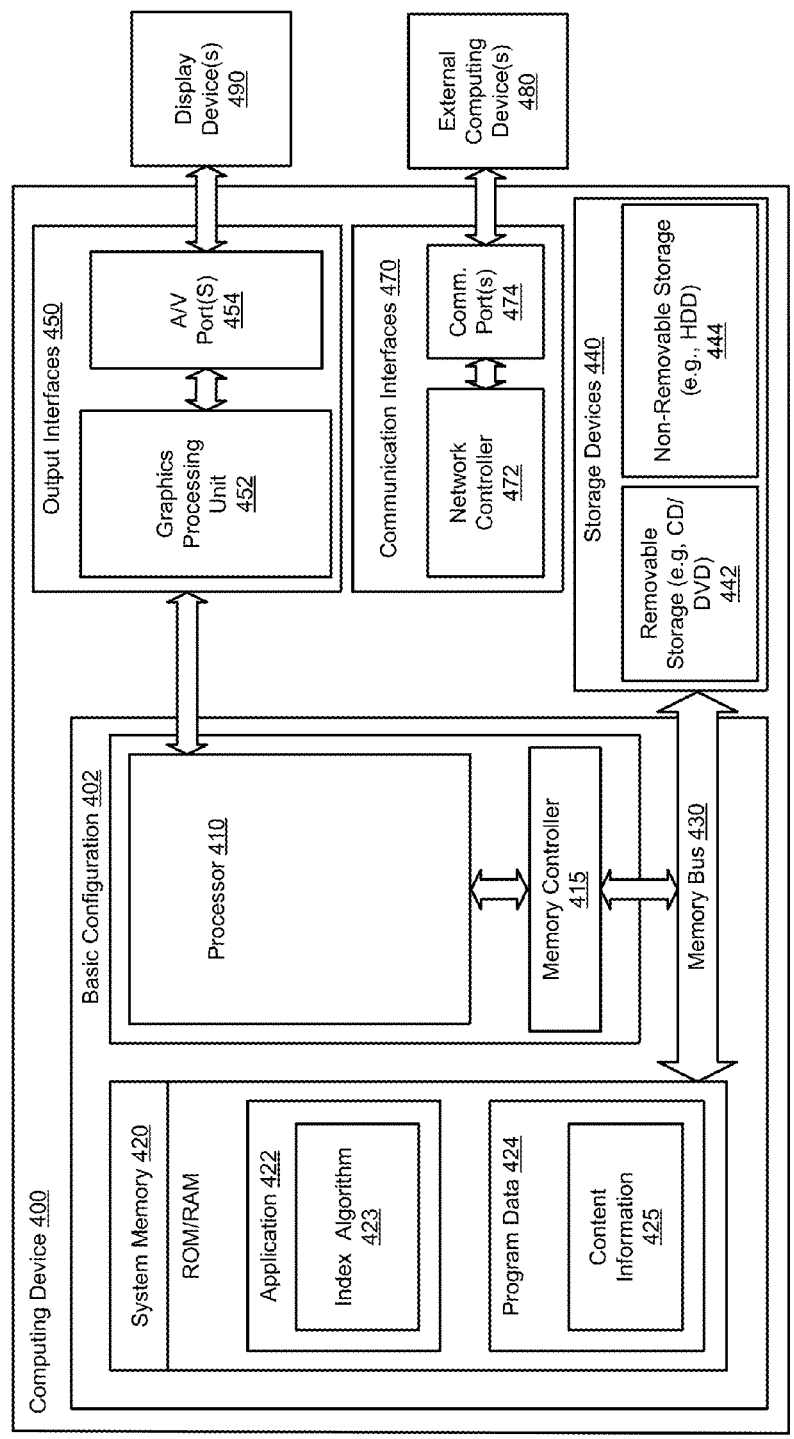
FIG. 4 illustrates an example computing device for performing some of the methods disclosed herein.

In some embodiments, a computing device may implement the disclosed methods as computer program instructions encoded on a non-transitory computer-readable storage media in a machine-readable format, or on other non-transitory media or articles of manufacture. FIG. 4 is a schematic illustrating a conceptual partial view of an example computer program product that includes a computer program for executing a computer process on a computing device, arranged according to at least some embodiments presented herein.

FIG. 4 illustrates a functional block diagram of a computing device 400, according to an embodiment. The computing device 400 can be used to perform functions in connection with radar units. In particular, the computing device can be used to perform some or all of the functions discussed above in connection with FIGS. 1-3 and FIG. 5 below. As shown in FIG. 4, the external computing device(s) 480 may be additional computing devices located external to the computing device 400.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (µP), a microcontroller (µC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, such as external computing device(s) 480, over a network communication by way of one or more communication ports 474. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium such as, but not limited to, a hard disk drive, a CD, a DVD, a digital tape, or memory. In some implementations, the signal bearing medium can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard or other transmission protocol).

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
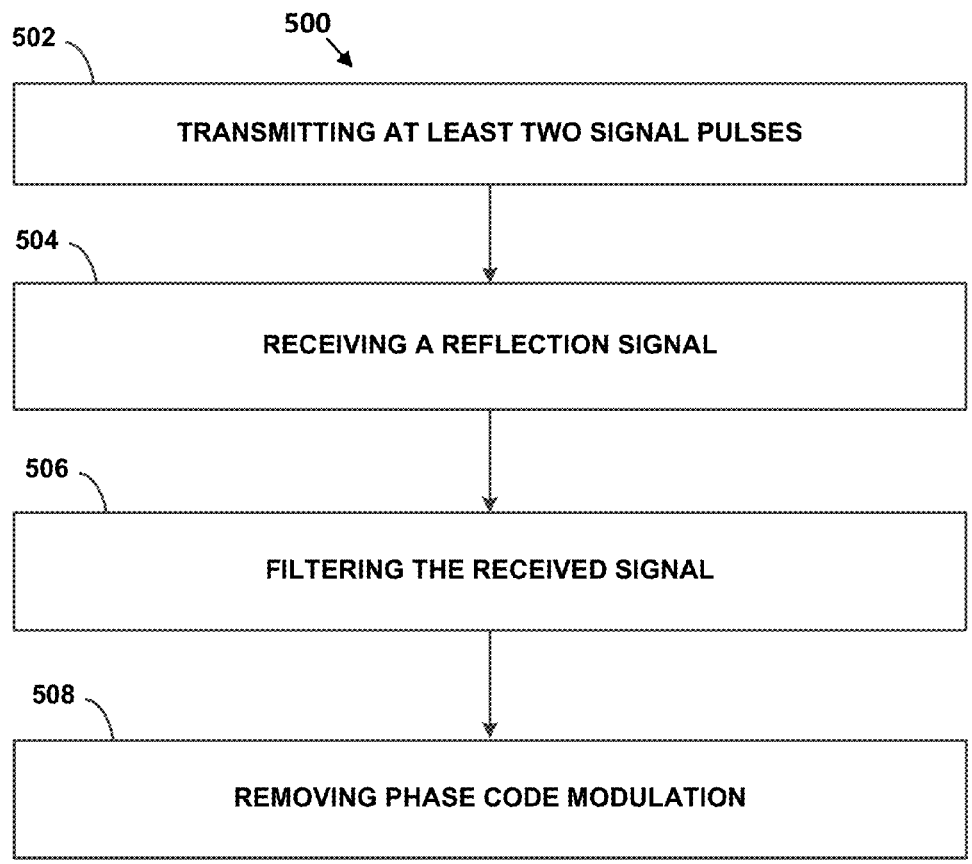
FIG. 5 is an example method for phase coded linear frequency modulation.

FIG. 5 is an example method 500 for phase coded linear frequency modulation. At block 502, the method 500 includes transmitting at least two signal pulses with one channel of a radar system. The first pulse may be transmitted with a first phase modulation and a first chip rate, and the second pulse may be transmitted after the first pulse with a second phase modulation and a second chip rate. The second chip rate may be different than the first chip rate.

As previously discussed, the transmitted pulse may be an LFM signal. Each transmitted pulse may be a chirp signal mixed with a BPSK encoding to form the modulated signal for transmission. Further, by transmitting the first pulse and subsequently transmitting the second pulse with different phase modulations, returned reflection pulses (i.e., signals) may be resolved into to separate reflection pulses (if the pulses are received overlapping in time, such as a previously-transmitted pulse). Additionally, by transmitting the first pulse and the second pulse with different chip rates for the BPSK encoding, sidelobe effects may be minimized. Sidelobe effects will be discussed further with respect to block 506.

A signal transmitted by the transmitter may have a phase history based on equation 1. In Equation 1, $\Lambda_{ref}(t)$ is the phase history at a given time t, f is a carrier frequency, $\gamma$ is the chirp rate, and $\hat{t}$ is the time relative to the start of a pulse.

$$\Lambda_{ref}(t) = 2\pi f t + \pi \gamma \hat{t}^2 \qquad \text{EQUATION 1:}$$

Equation 2 may specify the modulation function that forms the phase modulation for a transmitted signal. In Equation 2, $\phi_i$ is the phase modulation for the i-th channel, $C_i\{k\}$ indexes into k-th element the for the i-th channel, and ceil(x) is the ceiling function. The value of the phase modulation is determined by a random code C that has a k-th element having a value that is equal to either 0 or 1 with equal probability of the code being equal to 0 or 1.

$$\phi_i(\hat{t}) = C_i\{\text{ceil}(\gamma \hat{t})\} \qquad \text{EQUATION 2:}$$

At block 504, the method 500 includes receiving a reflection signal. The reflection signal may be a single reflection or a signal including several reflected signals. Further, the reflection signal may include reflection signals from more than one transmitted pulse from more than one radar channel (e.g., another radar unit). The reflection signals may be reflected from objects within the field of view of the radar system. The reflection signals may be received by an antenna or antenna system of the radar system. The antenna may output signals based on the received reflections for further processing by the radar system.

An example equation representing received reflection signal has a phase history based on Equation 3. In Equation 3, $\Lambda(t)$ is the phase history of the received signal at a given time t, r is a distance from an object that caused a reflection, and c is the speed of light. A received reflection signal having a phase modulation based on Equation 2 has a phase history based on Equation 4. In Equation 4, $\Lambda_i(t)$ is the phase history of the received signal at a given time t.

$$\Lambda(t) = 2\pi f\left(t - \frac{2r}{c}\right) + \pi\gamma\left(\hat{t} - \frac{2r}{c}\right)^2 \qquad \text{EQUATION 3}$$

$$\Lambda_i(t) = 2\pi f\left(t - \frac{2r}{c}\right) + \pi\gamma\left(\hat{t} - \frac{2r}{c}\right)^2 + \phi_i\left(\hat{t} - \frac{2r}{c}\right) \qquad \text{EQUATION 4}$$

At block 506, the method 500 includes filtering the received reflection signal. As part of filtering the received signal the radar system may use stretch processing. Stretch processing includes mixing the received signal with a similar signal to the transmission signal before digitization of the signal. For example, the received signal may be mixed with a chirp signal that is the conjugate of the chirp signal used to create the transmission signal. Stretch processing may reduce the digital bandwidth of the system by reducing the frequency of the various components of the received signals. For example, when a generic received reflection signal that has a phase history based on Equation 3 is mixed with a chirp, the result may be a signal defined similarly to Equation 5. In Equation 5, $\Lambda_{ref}*(t)$ is the conjugate phase history of the chirp signal at a given time t. Further, when stretch processing is used with a received reflection signal having a phase modulation and phase history based on Equation 4, the result may be a signal defined similarly to Equation 6.

$$\Lambda(t)\Lambda_{ref}^*(t) = \frac{4\pi fr}{c} + \frac{2\pi\gamma}{c}\hat{t}r + \frac{2\pi\gamma}{c}r^2 \quad \text{EQUATION 5}$$

$$\Lambda_i(t)\Lambda_{ref}^*(t) = \frac{4\pi fr}{c} + \frac{2\pi\gamma}{c}\hat{t}r + \frac{2\pi\gamma}{c}r^2 + \phi_i\left(\hat{t} - \frac{2r}{c}\right) \quad \text{EQUATION 6}$$

The signal based on Equation 6 may be quite computationally difficult to decode because it includes the superposition of the phase code at many different ranges, or equivalently, many different time delays. In order to reduce the computational requirements for decoding the signal, a range (or time) dependent delay may be applied to the signal before decoding. A digital delay of $$\frac{f_d}{\gamma}$$

may be applied. This digital delay changes the signal phase for a received signal by adding a factor $$\frac{-\pi f^2 d}{\gamma}.$$

By choosing $$f_d = \frac{2\gamma r}{c},$$

a delay equal to $$\frac{2r}{c}$$

can be set to time-align codes. In some examples, this delay can be implemented as a finite impulse response (FIR) filter in the time or frequency domain. Equation 7 denotes the signal model after the time delay is added. In Equation 7, F represents a forward Fourier Transform and $F^{-1}$ represents the reverse Fourier Transform.

$$F^{-1}\left[\exp\left(j\pi\frac{f^2}{\gamma}\right)F[\Lambda_i(t)\Lambda_{ref}^*(t)]\right] \simeq \quad \text{EQUATION 7}$$
$$\exp\left(\frac{4\pi fr}{c} + \frac{2\pi\gamma}{c}\hat{t}r + \phi_i(\hat{t})\right)$$

At block 508, the method 500 includes removing the phase code modulation. As previously discussed, the phase code may be removed by mixing the conjugate of the phase code with the signal represented by Equation 7. Equation 8 shows the removal of the phase code. Removal of the phase code may result in a single tone for a return from the waveform of interest. However, removal of the phase code will spread the undesirable return from other waveforms across the bandwidth. Thus, removal of the phase code may also provide some intermediate frequency (IF) bandwidth interference rejection. The single-tone output shown in Equation 8 can be processed to determine the objects that caused the reflection signals.

$$F^{-1}\left[\exp\left(j\pi\frac{f^2}{\gamma}\right)F[\Lambda_i(t)\Lambda_{ref}^*(t)]\right]\exp(\phi_i(\hat{t})) \simeq \quad \text{EQUATION 8}$$
$$\exp\left(\frac{4\pi fr}{c} + \frac{2\pi\gamma}{c}\hat{t}r\right)$$

In some examples, because the code time alignment function is a narrowband function, some amount of leakage creates strong range sidelobes at harmonics of the coding (or chip) rate. These harmonics can be undesirable. For example, the sidelobes may cause a radar system to determine a reflection is coming from the wrong location based on the sidelobe effect. Further, one reflection may manifest itself as appearing to be more than one reflection due to the sidelobe effect as well. To mitigate this sidelobe effect, the radar system may operate by adapting the chips rate in the slow time domain. That is, on a pulse-to-pulse basis the chip rate is changed. For example, as previously discussed, a first pulse may be transmitted with a first chip rate. A second pulse may be transmitted with a second chip rate different than the first. Because the chip rates are different, each may have a different sidelobe effect. Thus, when the reflections are compared with each other, only the main lobes will be aligned and the side lobe effects may be removed.

In some various examples, the chip rate may be varied for each pulse by adding between 0 to 100 kHz (selection is random and uniform over this interval) to the base chip rate of 500 kHz every pulse. This effectively whitens (i.e. spreads the sidelobes across) the spectrum of range sidelobes in the Doppler domain, resulting in a desirable thumbtack ambiguity function with sidelobes at about −30 decibels (dB). With this level of performance, matched filtering is adequate for search and track functions of the radar system. Further, this has the fortunate side effect of further whitening interference from other waveforms.

It should be understood that various processes, including but not limited to those described above, may be involved with the radiating, reception, and/or modulation. It should also be understood that arrangements described herein are for purposes of example only. As such, those skilled in the art will appreciate that other arrangements and other elements (e.g., machines, apparatuses, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method of signaling with a radar system comprising:
   randomly selecting a chip rate offset, wherein the chip rate offset is 100 kilohertz or less;

transmitting, by an antenna of a transmitter of a radar unit, at least two signal pulses, wherein each signal pulse comprises a linear frequency modulation, wherein the transmitting comprises:
    transmitting a first pulse, wherein the first pulse comprises an encoded signal encoded by a code synthesis module, wherein the code synthesis module encodes the signal with a first phase modulation and a first chip rate, and
    transmitting a second pulse, wherein the second pulse comprises a second encoded signal encoded by the code synthesis module, wherein the code synthesis module encodes the signal with a second phase modulation and a second chip rate, wherein the second chip rate is offset from the first chip rate by the randomly selected chip rate offset;
receiving, by the radar unit, a signal that includes at least two reflection signals associated with reflection of the at least two transmitted signal pulses; and
processing the received signal to determine target information, wherein the processing comprises:
    filtering the received signal to time-align the at least two reflection signals, wherein the filtering includes applying a frequency-dependent time delay to one or more of the at least two reflection signals, and
    removing phase modulations from the time-aligned reflection signals.

2. The method according to claim 1, wherein the filtering is performed with a finite impulse response filter.

3. The method according to claim 1, wherein removing phase modulations further comprises mixing each time-aligned reflection signal with a respective conjugate signal.

4. The method according to claim 1, wherein the processing further comprises, before the filtering, mixing, using a stretch processor, the received reflection signal with reference signals corresponding to the at least two transmitted pulses.

5. The method according to claim 1, wherein the first phase modulation and the second phase modulation are different phase modulations.

6. The method according to claim 1, wherein the method of signaling is performed by each of a plurality of radar units during overlapping time intervals, wherein each radar unit is located on a respective vehicle.

7. The method according to claim 6, wherein the signaling performed by each of the plurality of radar units is performed with a different phase modulation for each radar unit of the plurality of radar units.

8. A radar system comprising:
    a radar unit comprising:
        a transmitter configured to transmit at least two signal pulses by an antenna, wherein the transmitter being configured to transmit at least two signal pulses, wherein each signal pulse comprises a linear frequency modulation, wherein the transmitter being further configured to:
            transmit a first pulse, wherein the first pulse comprises an encoded signal encoded by a code synthesis module, wherein the code synthesis module encodes the signal with a first phase modulation and a first chip rate, and
            transmit a second pulse, wherein the second pulse comprises a second encoded signal encoded by the code synthesis module, wherein the code synthesis module encodes the signal with a second phase modulation and a second chip rate, wherein the second chip rate is offset from the first chip rate by 100 kilohertz or less based on a random selection of an offset;
        a receiver configured to receive a signal that includes at least two reflection signals associated with reflection of the at least two transmitted signal pulses;
        a processing unit configured to process the received signal to determine target information, wherein the processing unit being configured to process the received signal comprises the processing unit being configured to:
            filter the received signal to time-align the at least two reflection signals, wherein the filtering includes applying a frequency-dependent time delay to one or more of the at least two reflection signals, and
            remove phase modulations from the time-aligned reflection signals.

9. The radar system according to claim 8, wherein the filtering is performed with a finite impulse response filter.

10. The radar system according to claim 8, wherein removing phase modulations comprises mixing each time-aligned reflection signal with a respective conjugate signal.

11. The radar system according to claim 8, wherein the processing further comprises, before the filtering, mixing, using a stretch processor, the received reflection signal with reference signals corresponding to the at least two transmitted pulses.

12. The radar system according to claim 8, wherein the first phase modulation and the second phase modulation are different phase modulations.

13. The radar system according to claim 8, wherein the method of signaling is performed by each of a plurality of radar units during overlapping time intervals, wherein each radar unit is located on a respective vehicle.

14. The radar system according to claim 13, wherein the signaling performed by each of the plurality of radar units is performed with a different phase modulation for each radar unit of the plurality of radar units.

15. An article of manufacture including a non-transitory computer-readable medium, having stored thereon program instructions that, if executed by a computing device, cause the computing device to perform operations comprising:
    randomly selecting a chip rate offset, wherein the chip rate offset is 100 kilohertz or less;
    transmitting, by an antenna of a transmitter of a radar unit, at least two signal pulses, wherein each signal pulse comprises a linear frequency modulation, wherein the transmitting comprises:
        transmitting a first pulse, wherein the first pulse comprises an encoded signal encoded by a code synthesis module, wherein the code synthesis module encodes the signal with a first phase modulation and a first chip rate, and
        transmitting a second pulse, wherein the second pulse comprises a second encoded signal encoded by the code synthesis module, wherein the code synthesis module encodes the signal with a second phase modulation and a second chip rate, wherein the second chip rate is offset from the first chip rate by the randomly selected chip rate offset;
    receiving, by the radar unit, a signal that includes at least two reflection signals associated with reflection of the at least two transmitted signal pulses;
    processing the received signal to determine target information, wherein the processing comprises:
        filtering the received signal to time-align the at least two reflection signals, wherein the filtering includes applying a frequency-dependent time delay to one or more of the at least two reflection signals, and removing phase modulations from the time-aligned reflection signals.

16. The article of manufacture according to claim 15, wherein the filtering is performed with a finite impulse response filter.

17. The article of manufacture according to claim 15, wherein removing phase modulations comprises mixing each time-aligned reflection signal with a respective conjugate signal.

18. The article of manufacture according to claim 15, wherein the processing further comprises, before the filtering, mixing, using a stretch processor, the received reflection signal with reference signals corresponding to the at least two transmitted pulses.

19. The article of manufacture according to claim 15, wherein the first phase modulation and the second phase modulation are different phase modulations.

20. The article of manufacture according to claim 15, wherein the method of signaling is performed by each of a plurality of radar units during overlapping time intervals, wherein each radar unit is located on a respective vehicle, and wherein the signaling performed by each of the plurality of radar units is performed with a different phase modulation for each radar unit of the plurality of radar units.

* * * * *